April 16, 1963  E. G. ORE  3,085,545
SCARECROW
Filed May 4, 1961
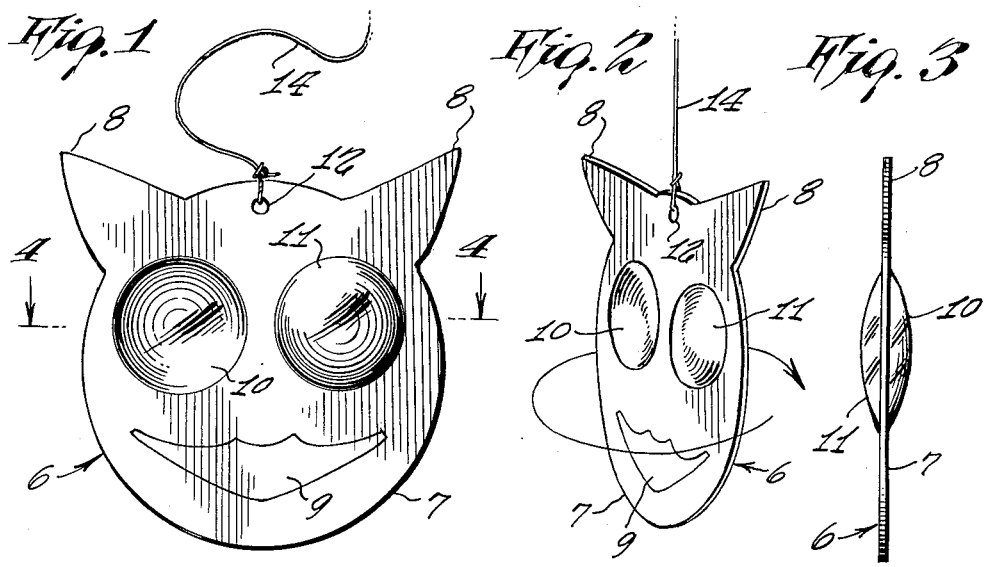
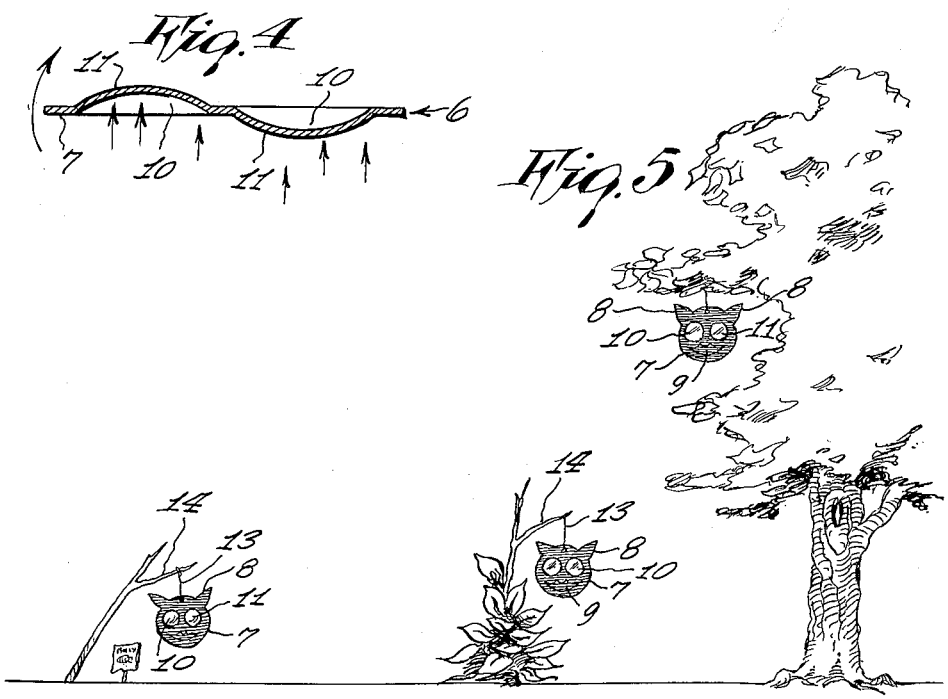
INVENTOR.
ERNEST ORE

3,085,545
SCARECROW
Ernest G. Ore, 33–25 92nd St., Jackson Heights 72, N.Y.
Filed May 4, 1961, Ser. No. 107,818
6 Claims. (Cl. 116—22)

The present invention relates to guarding and fright producing devices and equipment and particularly to a special scarecrow.

The main object of my invention is to produce a scarecrow of especially effective character which serves to scare off birds and smaller animals where used in orchards and fields of growing greens.

An ancillary object of my invention is to provide a scarecrow which utilizes several features simultaneously in order to obtain a cumulative effective in scaring off undesirable animals from all gardens and orchards equipped with such scarecrows.

Another object of this invention is to have a feline type of scarecrow inasmuch as cats and other felines easily scare other creatures when encountered in the open.

A further object of the invention is to provide a scarecrow with prominent luminescent and/or reflecting eyes which may be transparent or translucent, and preferably in the red spectrum in color.

Yet another object is to have the scarecrow provided with a lurid red mouth, while the face as a whole is black.

It is, of course a practical object of the invention to have a scarecrow which is simple in construction, despite its effectiveness and easy to manufacture at a low cost in order to encourage wide distribution on a wide market.

Other objects and advantages of my invention will become apparent as the specification proceeds.

In order to facilitate clear comprehension of this invention for a proper appreciation of the salient features thereof, the invention is illustrated on the accompanying drawing forming part hereof, and in which:

FIGURE 1 is a front elevation of a scarecrow made according to my invention and embodying the same in a practical form;

FIGURE 2 is a perspective view of the same scarecrow shown suspended and rotating in active effective condition;

FIGURE 3 is a side elevation of the scarecrow as seen from the right side in FIGURE 1;

FIGURE 4 is an enlarged transverse section as taken on line 4—4 in the same FIGURE 1; while FIGURE 5 illustrates in a pictorial view how several examples of the scarecrow may be suspended in various useful positions for active use.

Throughout the views, the same reference numerals indicate the same parts.

Hence, in the practice of my invention, a substantially flat plate of fibre, metal or plastic, generally indicated at 6 is preferably made in the form of a cat's head 7 with projecting ears 8, 8, and completely black in color except for three areas. One such area at 9 is formed to simulate a cat's mouth and given a lurid red color, but the other two areas 10 aand 11 are first of all respectively made concave and convex in form to simulate eyes, and in addition are made reflecting and/or fluorescent with a lurid red color. In other words, upon each of the two sides of the plate 6 are formed one concave and one convex eye area and a substantially flat mouth, so that upon each side is given a similar view of a concave eye area 10 and a convex eye area 11 and a mouth 9 upon the flat black background of plate 6, and forming thus a cat's head. A feline head is selected as best scaring predatory birds and creatures when equipped as just described.

In the upper portion of the cat's head 7 is formed a hole 12 to which is secured a suspension cord 13 by which to suspend the device to twigs 14 or branches in clear positions to rotate unidirectionally in the wind. This is due to the fact that the eyes 10, 10 are located symmetrically with respect to hole 12 and suspension cord 13 and the opposite concave/convex relation of eyes 10 and 11, and that only two are used. Such unidirectional rotation is effected by the air striking the differently formed eyes 10 and 11 and by such rotary motion scaring off predatory creatures and birds.

Manifestly, variations may be resorted to, and parts and features may be modified or used without others within the scope of the appended claims.

Having now fully described my invention, I claim:

1. A unidirectionally rotatable scarecrow adapted to be suspended from a twig, branch or other support, including a substantially flat plate having the otuline of a feline animal and means at the upper edge for attaching a cord thereto for suspending said plate in a freely rotating position, the plate having a dark color and two limited areas spaced apart thereon and respectively formed circularly concave and circularly convex upon each side of said plate to provide propulsion means for rotating said plate by the wind, said spaced apart areas each being relatively larger thereacross than the distance therebetween.

2. A unidirectionally rotatable scarecrow according to claim 1, wherein the two spaced apart areas are convex and concave from each side of the plate so that one side of the latter is a duplicate of the other.

3. A unidirectionally rotatable scarecrow according to claim 2, wherein the two convex and concave areas are at least reflecting and preferably fluorescent and concave areas are light responsive.

4. A unidirectionally rotatable scarecrow according to claim 3, wherein the plate has an outline of a cat's head with projecting ears and has a hole located symmetrically between for attaching the cord thereto, the flat area of the plate as a whole being black with the two convex and concave areas independent thereof and a mouth area being disposed below said last two areas.

5. A unidirectionally rotatable scarecrow according to claim 4, wherein the convex and concave areas form lurid gleaming eyes and the mouth area below the same is of lurid red color and formed to simulate a cat's mouth.

6. A unidirectionally rotatable scarecrow according to claim 5, wherein the eyes and mouth are of lurid reflecting character and the rest of the plate is substantially black in color.

References Cited in the file of this patent

UNITED STATES PATENTS

| | | |
|---|---|---|
| 305,102 | Nelson | Sept. 16, 1884 |
| 1,167,502 | Huffman | Jan. 11, 1916 |
| 2,483,463 | Jefferies et al. | Oct. 4, 1949 |
| 2,488,510 | Lewin | Nov. 15, 1949 |
| 2,722,195 | Rockafeller | Nov. 1, 1955 |